Nov. 17, 1925.
G. J. SOUKUP
1,562,264
CORN HARVESTING MACHINE
Filed April 18, 1925      2 Sheets-Sheet 1
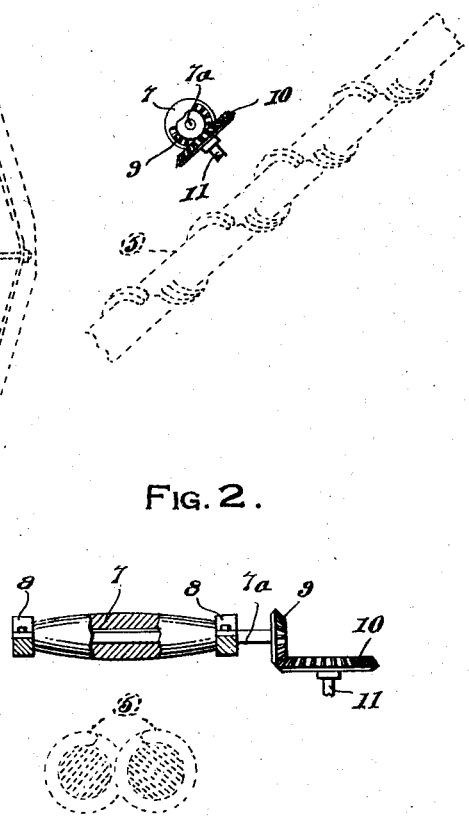
FIG. 3.
FIG. 2.
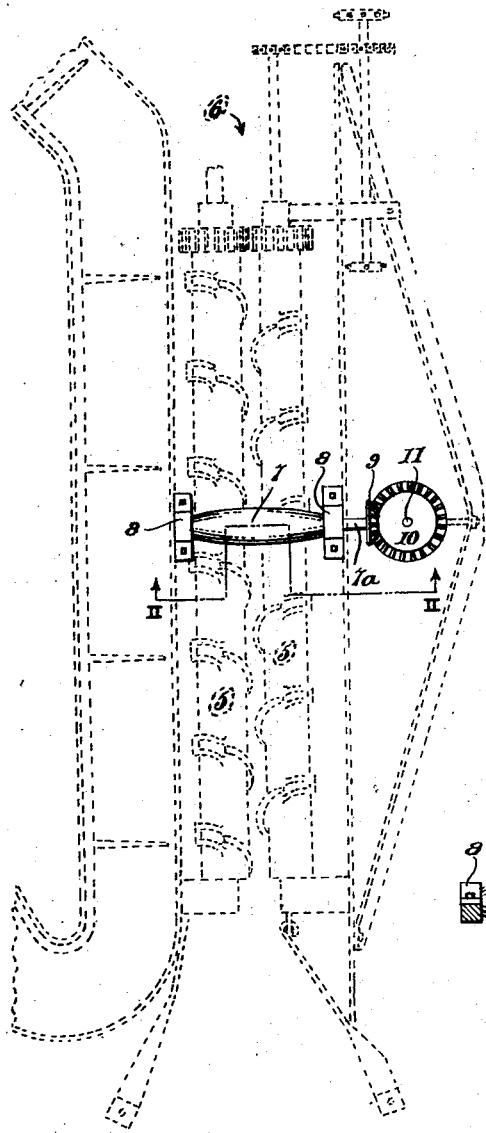
FIG. 1.
Inventor
G. J. Soukup
By Bryant & Lowry
Attorneys Nov. 17, 1925.
G. J. SOUKUP
1,562,264
CORN HARVESTING MACHINE
Filed April 18, 1925    2 Sheets-Sheet 2
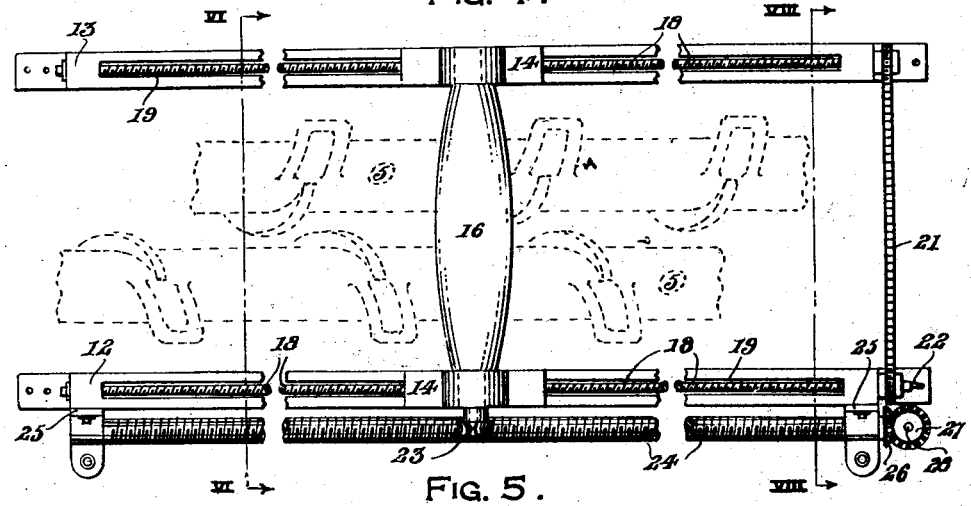
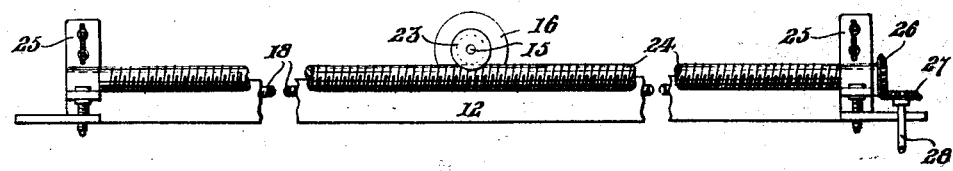
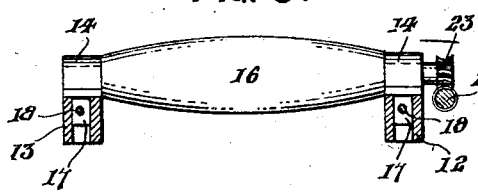
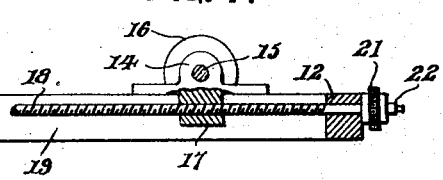
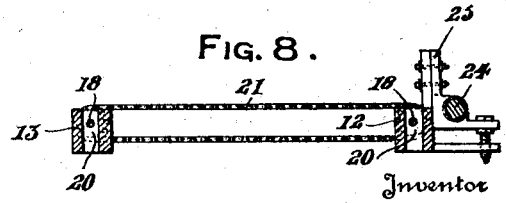

Patented Nov. 17, 1925.

1,562,264

UNITED STATES PATENT OFFICE.

GEORGE J. SOUKUP, OF WAGNER, SOUTH DAKOTA.

CORN-HARVESTING MACHINE.

Application filed April 18, 1925. Serial No. 24,112.

*To all whom it may concern:*

Be it known that I, GEORGE J. SOUKUP, a citizen of the United States of America, residing at Wagner, in the county of Charles Mix and State of South Dakota, have invented certain new and useful Improvements in Corn-Harvesting Machines, of which the following is a specification.

This invention relates to improvements in corn harvesting machines.

The primary object of the invention is to provide means for improving the efficiency of the stripping rolls of a corn harvesting machine.

A further object of the invention is the provision of an adjustable member which will cooperate with the stripping rolls of a corn harvesting machine for insuring the separating or severing of all of the ears from the stalks and the clearing of the cleaned stalks from the stripping mechanism.

Other objects and advantages of the invention will be apparent during the course of the following description.

In the accompanying drawings forming a part of this specification and in which like numerals are employed to designate like parts throughout the same, Figure 1 is a fragmentary top plan view of a corn harvesting machine, shown in dotted lines, with the improvement embodying this invention shown associated therewith, in full lines, Figure 2 is a transverse sectional view taken upon line II—II of Fig. 1, Figure 3 is a fragmentary side elevational view of a portion of the structure shown in Fig. 1, Figure 4 is a modified form of roller shown adjustably associated with the stripping rollers of a harvesting machine, the said adjustable roller and stripping rolls being shown in elevation, Figure 5 is a side elevational view of the structure shown in Fig. 4, Figure 6 is a transverse sectional view taken upon line VI—VI of Fig. 4, Figure 7 is a detail end elevational view of the adjustable roller shown in Fig. 4, and Figure 8 is a transverse sectional view taken upon line VIII—VIII of Fig. 4.

In the drawings, wherein for the purpose of illustration is shown a preferred embodiment of this invention, the numeral 5 designates the stripping rollers of the stripping portion of a corn harvesting machine, the said stripping rollers being arranged in parallelism and driven by the mechanism designated in its entirety by the reference character 6.

In Figs. 1 to 3 inclusive the stripping rolls 5 are illustrated as having associated therewith the overlying, transversely extending roller 7 which is journaled in the stationary brackets 8. This roller 7 is illustrated as having mounted upon its shaft 7ª a bevel pinion 9 which meshes with the bevel gear 10 carried by the vertical shaft 11. This shaft 11 is intended to be suitably connected to the driving mechanism of the stripping rolls 5.

In Figs. 4 to 8 inclusive a modified form of roller is shown as associated with the stripping rolls 5. The reference numerals 12 and 13 designate a pair of longitudinally slotted guides which are arranged above and outwardly of the stripping rolls 5 and in parallelism with each other and the said rolls.

Slidably mounted upon these guides 12 and 13 are the bearing blocks 14 which have journaled therein a shaft 15 upon which is mounted the roller 16. These bearing blocks 14 are each provided with a boss 17 of substantially rectangular formation and having horizontally extending, internally screw threaded bores which receive the threaded shafts 18 extending longitudinally of the said guides 12 and 13, the said bosses 17 being received within the slots 19 of the said guides.

It will now be noted that by rotating the threaded shafts 18, the bearing blocks 14 will be moved longitudinally of the guides 12 and 13. To cause these bearing blocks to slide in unison, the adjacent ends of the shaft 18 are provided with sprocket wheels 20, best shown in Figs. 4 and 8, which have riding thereupon a sprocket chain 21. A squared end 22 is formed upon one shaft 18 and is adapted for being engaged by a crank or the like by means of which the said shaft may be rotated for causing longitudinal adjustment of the roller 16 in respect to the stripping rolls 5.

For permitting driving or rotating of the roll 16, irrespective of its position upon the guides 12 and 13, the shaft 15 has mounted thereupon a grooved pinion 23 which is intended to mesh with the worm gear 24 extending longitudinally of the guide 12 and adjustably supported in respect thereto by the bearing brackets 25, it being noted that the worm gear 24 extends the full length of the slotted portion of the guide 12. One end of this adjustable worm gear 24 is provided with a bevel gear 26 meshing with a bevel gear 27 carried by a driven shaft 28. This shaft 28 may be suitably connected to the driving mechanism for the stripping rolls 5.

The arrangement of the rolls 7 and 16, in the two different forms shown, over the stripping rolls 5 is for the purpose of causing the stalks bearing ears of corn which pass between the stripping rolls 5 to be bent over in the direction of travel of the harvesting machine for the purpose of insuring the engagement of the ears of corn with the stripping rolls. These rollers 7 and 16 will also cause the cleaned stalks to be cleared from the stripping rolls 5 before they engage with the driving mechanism 6, shown in Fig. 1.

The adjustable roller shown in Figs. 4 to 8 inclusive will permit the same to be arranged at any desired point along the length of the stripping rolls 5 for producing the best results obtainable.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a device of the type described, the combination with the stripping rolls of a corn harvesting machine, of a roller transversely overlying said rolls and adjustable longitudinally in respect thereto, and means for driving said roller.

2. In a device of the type described, the combination with the stripping rolls of a corn harvesting machine, of a pair of spaced longitudinally slotted guides extending in parallelism with said stripping rolls, a bearing block slidable on each guide, a shaft journaled in said blocks, a roller on said shaft, means for sliding said bearing blocks in unison along said guides, and means for driving the roller shaft irrespective of the positions of the bearing blocks on said guides.

3. In a device of the type described, the combination with the stripping rolls of a corn harvesting machine, of a pair of spaced, longitudinally slotted guides extending in parallelism with said stripping rolls, a bearing block slidable on each guide, a shaft journaled in said blocks, a roller on said shaft, means for sliding said bearing blocks in unison, a grooved pinion on the roller shaft, a worm gear extending the full length of the slotted guides and adjustable into mesh with said pinion, and means for rotating the worm gear to drive the roller shaft irrespective of the positions of the bearing blocks on said guides.

In testimony whereof I affix my signature.

GEORGE J. SOUKUP.